United States Patent [19]
Guger

[11] 3,990,593
[45] Nov. 9, 1976

[54] STORAGE ATTACHMENTS FOR VEHICLES

[76] Inventor: Max E. Guger, Rte. 3, P.O. Box 155, Traverse City, Mich. 94684

[22] Filed: Mar. 3, 1975

[21] Appl. No.: 554,477

[52] U.S. Cl. .............................. 214/390; 254/8 R
[51] Int. Cl.² ............................................ B60P 3/40
[58] Field of Search ........... 214/390, 374, 375, 380, 214/381, 382, 383, 384; 280/46, 47.24; 254/131, 8 R, 8 B, 8 C

[56] References Cited
UNITED STATES PATENTS

| | | | |
|---|---|---|---|
| 1,915,881 | 6/1933 | Domke et al. | 254/131 |
| 3,108,702 | 10/1963 | Chesney | 214/375 |
| 3,193,301 | 7/1965 | Talbert et al. | 214/390 X |
| 3,233,764 | 2/1966 | Hinch | 214/384 |
| 3,647,237 | 3/1972 | Milton | 214/390 X |
| 3,667,728 | 6/1972 | Garelick | 214/390 X |
| 3,860,078 | 1/1975 | Stoick | 280/79.1 |

*Primary Examiner*—Albert J. Makay
*Attorney, Agent, or Firm*—Glenn B. Morse

[57] ABSTRACT

An object, such as a snowmobile, having transverse bars at the ends is prepared for storage by engaging attachments with the bars, the attachments preferably having casters disposed so that the object must be lifted slightly in order to bring the casters directly under the engaged bars. Each of the attachments is either forced over-center to engage an abutment, or is secured otherwise against rotation out from under the bar. The usual towing coupling of a snowmobile is used for the latter purpose.

1 Claim, 8 Drawing Figures

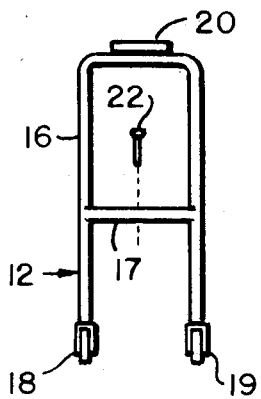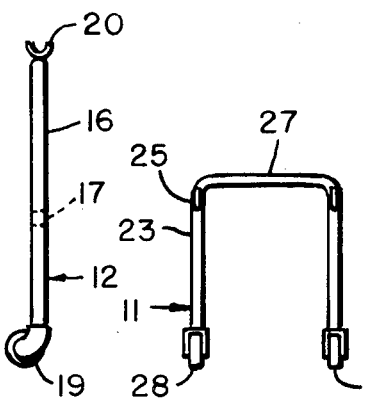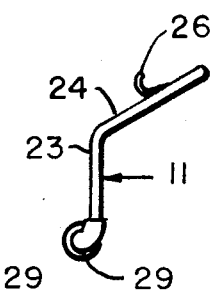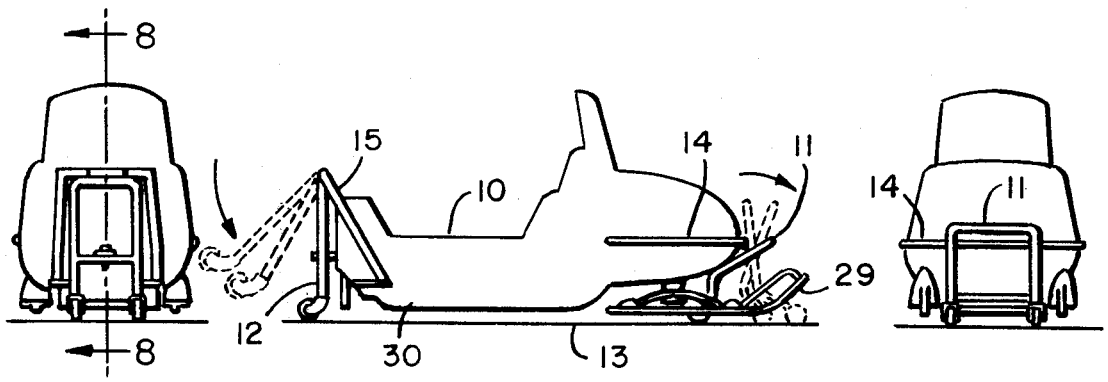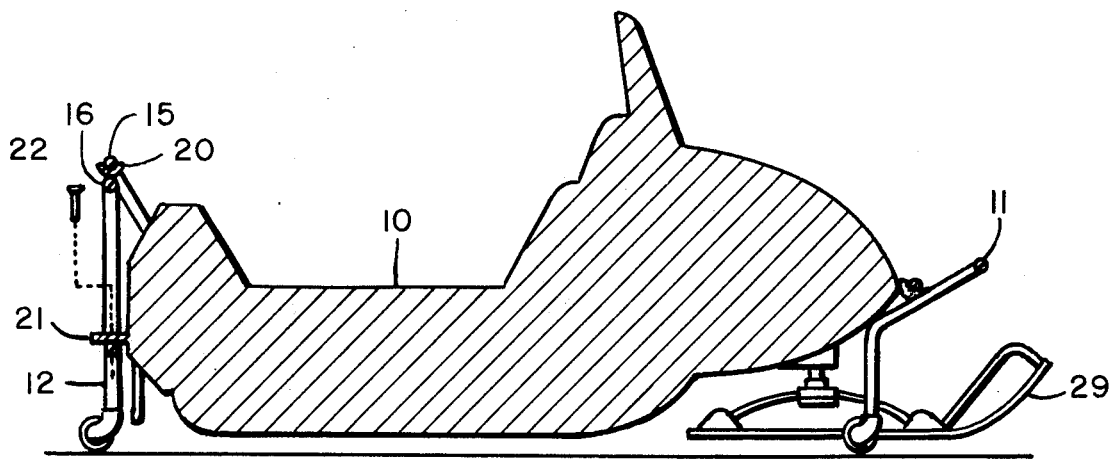

3,990,593

STORAGE ATTACHMENTS FOR VEHICLES

BACKGROUND OF THE INVENTION

Handling snowmobiles in a service area or showroom is a troublesome nuisance. Even if the engines are in condition to be started, ventilation in these areas is almost always inadequate. If the transmission can be disengaged, they can be pushed in the normal direction of travel only with considerable effort, as a result of the drag of the forward ski unit. Moving these vehicles laterally requires that they be picked up bodily and shifted.

It is common practice to pick up and carry objects of various shapes with the use of hand-operated wheel trucks, but it is extremely difficult to find a place to engage one of these trucks with an object having a configuration like that of a snowmobile. In the usual case, it becomes necessary to lift the object manually in order to engage the hand truck at all. When successful, the operation has to be done on the opposite sides of the machine, obviously requiring two men and two hand trucks.

One of the types of devices commonly used to pick up and transport objects utilizes wheels or casters in conjunction with a cam or over-center lifting arrangement having sufficient travel to elevate the object off the floor so that it can be supported by the wheels. These principles are utilized in conjunction with the conventional construction of snowmobiles that provides a peripheral guard bar at both front and rear. Any other object having a structurally similar configuration can also make use of this invention.

SUMMARY OF THE INVENTION

Attachments are provided for interengagement with the guard bars of a snowmobile preferably at both front and rear. These attachments have casters positioned so that the attachment can be interengaged with the underside of the bar, and pushed into a position in which the wheels lift the object as they are moved directly underneath the bar. The attachments are secured in this position either by permitting them to move over-center to the point of engaging an abutment, or by otherwise securing them in a position such that the snowmobile remains lifted off the ground, and supported by the wheels. At the rear of the machine, the usual towing coupling is utilized as the securing point to keep the attachment from slipping out from under the guard bar. With the attachments in place, the vehicle is easily moved across a floor in any direction by a relatively gentle push.

DESCRIPTION OF THE DRAWINGS

FIG. 1 is an end elevation of the attachment associated with the rear of a conventional snowmobile.

FIG. 2 is a side elevation of the FIG. 1 attachment.

FIG. 3 is a front elevation of the attachment associated with the front of a conventional snowmobile.

FIG. 4 is a side elevation of the FIG. 3 attachment.

FIG. 5 is a rear elevation showing the engagement of the FIG. 1 attachment with the rear of a snowmobile.

FIG. 6 is a side elevation showing the engagement of both attachments with the snowmobile.

FIG. 7 is a front elevation showing the engagement of the FIG. 3 attachment with the snowmobile.

FIG. 8 is an enlarged sectional elevation showing the assembly of the attachments to the vehicle as indicated in FIG. 6.

DESCRIPTION OF THE PREFERRED EMBODIMENTS

The snowmobile indicated at 10 in FIG. 6 has been engaged by the attachment 11 at the front, and the attachment 12 at the rear. The engagement of these attachments has resulted in the support of the snowmobile clear of the supporting floor 13. The front attachment 11 is engaged primarily with the front guard bar 14, and the rear attachment to the rear guard bar 15. Referring to FIGS. 1 and 2, the rear attachment is in the form of a U-shaped tubular member 16, with the cross beam 17 connecting the opposite legs of the tubular configuration in the central area. Casters 18 and 19 are mounted at the bottom of the legs of the member 16. A receptacle 20 is approximately semi-cylindrical, with an inside dimension adapted to fit underneath the guard bar 15. When the attachment is in the position shown in FIGS. 6 and 8, the cross beam 17 is positioned adjacent the towing coupling 21, so that the bolt 22 can be passed through an appropriate hole in the beam 17, and can engage the coupling 21 to secure the attachment 12 against clockwise rotation about the bar 15 (as viewed in FIG. 6).

At the front of the vehicle, the attachment 11 also has a U-shaped configuration in front elevation, and is preferably a steel tube of the same type used on the rear attachment. The tubular member 23 has a bend in side elevation as shown in FIG. 4 to provide an abutment surface at 24 on both legs of the member 23. The receptacles 25 and 26 are in the form of hooks welded through the member 23, and engage the underside of the front bar 14 as shown in FIG. 6. As the device is engaged in this manner, it is rotated clockwise about the bar 14 either by foot pressure, or by force applied to the transverse portion 27 of the member 23. This action brings the casters 28 and 29 under the bar 14, and the distance from these casters to the receptacles 25 and 26 is sufficiently greater than the normal distance of the bar 14 from ground level to induce the lifting action illustrated in FIGS. 6 and 8. This direction of rotation is continued until the surfaces 24 abut against the underside of the nose of the vehicle, as shown in FIG. 6, thus bringing the unit "over-center" into a stable position. The proportions of the attachment are such that the snowmobile is still supported off the ground surface in this position. The ski unit 29 at the front of the vehicle, as well as the track assembly under the intermediate area 30 are thus lifted clear, and the vehicle can be moved over the floor 13 in any direction on the casters 18–19 and 28–29.

I claim:

1. In combination with a vehicle having a transverse bar at opposite one end thereof and an overhanging portion adjacent said bar at least at one of said ends, said object also having coupling means below said bar at the opposite of said ends, comprising:

a first supporting attachment, said first attachment having receptacle means engagable with said bar at one of said ends, said attachment having ground-engaging means spaced from said receptacle means a distance, slightly greater than the normal distance of said bar at one end above ground level, said first attachment having an abutment surface engagable with said overhanging portion when said ground-engaging means is disposed at one side of a vertical from said bar at one end; and a second supporting attachment, said second attachment having receptacle means engagable with said bar at the other of said ends, said second attachment having ground-engaging means spaced from said receptacle means thereof a distance slightly greater than the normal distance from said bar at the other of said ends above ground level, said second attachment also having securing means engagable with said coupling means.

* * * * *